(12) United States Patent
Matsumoto et al.

(10) Patent No.: US 10,436,298 B2
(45) Date of Patent: Oct. 8, 2019

(54) SCREW FEEDING DEVICE AND ACTUATOR USING SAME

(71) Applicants: HIRATA CORPORATION, Kumamoto-shi, Kumamoto (JP); THK CO., LTD., Tokyo (JP)

(72) Inventors: Bungo Matsumoto, Kumamoto (JP); Yuji Kubota, Tokyo (JP); Tomoya Uchikoshi, Tokyo (JP)

(73) Assignees: HIRATA CORPORATION, Kumamoto-shi (JP); THK CO., LTD., Tokyo (JP)

( * ) Notice: Subject to any disclaimer, the term of this patent is extended or adjusted under 35 U.S.C. 154(b) by 250 days.

(21) Appl. No.: 15/534,638

(22) PCT Filed: Dec. 3, 2015

(86) PCT No.: PCT/JP2015/083965
§ 371 (c)(1),
(2) Date: Jun. 9, 2017

(87) PCT Pub. No.: WO2016/104092
PCT Pub. Date: Jun. 30, 2016

(65) Prior Publication Data
US 2018/0259045 A1    Sep. 13, 2018

(30) Foreign Application Priority Data

Dec. 25, 2014 (JP) ................................. 2014-262171

(51) Int. Cl.
*F16H 25/24* (2006.01)
*F16H 25/20* (2006.01)
(Continued)

(52) U.S. Cl.
CPC ..... *F16H 25/2021* (2013.01); *F16H 25/2214* (2013.01); *F16H 25/24* (2013.01); *H02K 7/06* (2013.01); *F16H 2025/2075* (2013.01)

(58) Field of Classification Search
CPC ...... F16H 25/20; F16H 25/24; F16H 25/2021; F16H 25/2214; F16H 2025/2075; H02K 7/06
See application file for complete search history.

(56) References Cited

U.S. PATENT DOCUMENTS 3,659,683 A * 5/1972 Betzing ............... F16H 25/2204
188/162
3,898,399 A * 8/1975 Yasui .................. H01H 19/186
200/47
(Continued)

FOREIGN PATENT DOCUMENTS

JP    56-167949 A    12/1981
JP     60-82515 A     5/1985
(Continued)

OTHER PUBLICATIONS

International Search Report dated Mar. 1, 2016, issued in counterpart of International Application No. PCT/JP2015/083965 (2 pages).
(Continued)

*Primary Examiner* — Thomas C Diaz
(74) *Attorney, Agent, or Firm* — Westerman, Hattori, Daniels & Adrian, LLP

(57) ABSTRACT

Provided a screw feeding device, in which a buffer mechanism is incorporated between a rod member and a nut member. The screw feeding device includes: a screw shaft; the nut member, which has a flange portion, the rod member, which has a mounting portion facing the flange portion and a hollow portion; and a buffer mechanism, which connects the flange portion and the mounting portion, in which the buffer mechanism includes: a plurality of shafts, a pair of
(Continued)

separators, through which the plurality of shafts pass, and which is movable along the plurality of shafts; and an elastic member, provided between the pair of separators, in which the plurality of shafts include: a shaft, fixed to the flange portion; and a shaft fixed to the mounting portion.

7 Claims, 7 Drawing Sheets

(51) Int. Cl.
     *H02K 7/06*      (2006.01)
     *F16H 25/22*      (2006.01)

(56) References Cited

U.S. PATENT DOCUMENTS 3,987,323 A * 10/1976 Hess .................. F16H 25/2021
                                                           310/80
2013/0255412 A1* 10/2013 Ding .................. B66F 7/14
                                                          74/89.23

FOREIGN PATENT DOCUMENTS

| JP | 64-15854 U1 | 1/1989 |
| JP | 1-264544 A | 10/1989 |
| JP | 2010-112519 A | 5/2010 |

OTHER PUBLICATIONS

Written Opinion of the International Searching Authority PCT/ISA/237 dated Mar. 1, 2016, of PCT/JP2015/083965 (3 pages).

* cited by examiner

SCREW FEEDING DEVICE AND ACTUATOR USING SAME

TECHNICAL FIELD

The present invention relates to a screw feeding device, which has a buffer function to alleviate an impact load front outside, and to an actuator using the screw feeding device.

BACKGROUND ART

In the screw feeding device, a nut member is threadedly engaged with a screw shaft having helical grooves formed on an outer peripheral surface. The screw feeding device has a function to convert a rotational motion of the screw shaft into a linear motion of the nut member. Therefore, the screw feeding device is suitable for use in converting the rotational motion of an electric motor into the linear motion. For example, the screw feeding device is employed for an actuator configured to output the rotation of the electric motor as an advancing and retreating motion of a rod member. In this actuator, in order to efficiently convert the rotational motion of the electric motor into the advancing and retreating motion of the rod member, a ball screw device, in which rolling elements such as balls are interposed between the screw shaft and the nut member, is employed as the screw feeding device. In this actuator, an amount of advancement and retreat of the rod member is determined in accordance with a rotation angle of the electric motor.

Meanwhile, depending on the usage of the actuator, there is a case where other members are desired to be elastically pressed by the rod member, or a case where the impact load, which acts on the rod member from outside, is desired to be reduced without acting on the screw feeding device. In Patent Literature 1, there is disclosed a screw feeding device, in which a buffer mechanism is provided between the nut member and the rod member. In the screw feeding device disclosed in Patent Literature 1, the rod member includes a piston configured to receive the nut member, whereas a pair of spring holders is fitted to an outer peripheral surface of the nut member. The pair of spring holders is fitted to a groove formed in the outer peripheral surface of the nut member, and is freely movable in the groove in an axial direction. Further, a spring is provided between the pair of spring holders under a compressed state. The piston of the rod member has an engaging flange positioned on an outer side of the pair of spring holders. When the rod member advances or retreats in the axial direction, the engaging flange interferes with any one of the spring holders so that the spring holder moves in a direction of compressing the spring.

In the screw feeding device disclosed in Patent Literature 1, even when any one of a compressive load or a tensile load acts between the nut member and the rod member, the engaging flange of the rod member presses the spring holder in the direction of compressing the spring so that the compressive load acts on the spring. Accordingly, when the compressive load exceeding an elastic force exerted by the spring acts on the spring, the spring is compressed so that the other members are elastically pressed by the rod member. In addition, the impact load acting on the rod member from outside can be reduced without directly acting on the screw feeding device.

CITATION LIST

Patent Literature

[PTL 1] JP 01-264544 A

DISCLOSURE OFF THE INVENTION

Problems to be Solved by the Invention

However, in the screw feeding device disclosed in Patent Literature 1, the rod member includes the piston configured, to receive the nut member, and the buffer mechanism is provided, between the piston and the nut member. Thus, at maximum outer diameter of the rod member becomes larger than an outer diameter of the nut member. As a result, there is a problem in that an entire screw feeding device may be upsized. Further, along with the upsizing of the screw feeding device, there is also a problem in that the actuator, to which the screw feeding device is applied, may be upsized.

Means for Solving the Problems

The present invention has been made in view of the problems as described above, and has an object to provide a screw feeding device, in which a buffer mechanism is incorporated between a rod member and a nut member, and which is capable of achieving downsizing of an entire device, and to provide an actuator, which is downsized using the screw feeding device.

That is, a screw feeding device according to one embodiment of the present invention includes: a screw shaft; a rod member, which has a flange portion formed on an outer peripheral surface thereof, and is mounted to the screw shaft; a rod member, which has a mounting portion facing the flange portion of the nut member and a hollow portion; and a buffer mechanism, which connects the flange portion of the nut member and the mounting portion of the rod member. The buffer mechanism includes: a plurality of shafts, which are provided around the nut member; a pair of separators, through which the plurality of shafts pass, and which is movable along the plurality of shafts; and an elastic member, which is provided between the pair of separators under a compressed state. The plurality of shafts include: a shaft, which is fixed to the flange portion of the nut member; and a shaft, which is fixed to the mounting portion of the rod member. Further, the screw feeding device according to one embodiment of the present invention is configured to transmit a load between the nut member and the rod member through intermediation of the pair of separators, which are relatively movable to each other.

Further, the actuator according to one embodiment of the present invention includes the screw feeding device and is configured to convert a rotational motion, input from an electric motor into an advancing and retreating motion of the rod member in an axial direction to output the advancing and retreating motion.

Effects of the Invention

According to the present invention, for example, in a case of bearing a load drawing the rod member, or in a case of bearing a load pressing the rod member, the load is transmitted between the nut member and the rod member through intermediation of the buffer mechanism. At this time, in the buffer mechanism, the elastic member is compressed between the pair of separators. Even when a tensile load or a compressive load is transmitted to the buffer mechanism, the elastic member bears the load. Further, the shafts, which are configured to guide the separators in the buffer mechanism in a movable manner, are fixed to the flange portion of the nut member or to the mounting portion of the rod member. Thus, the buffer mechanism can be downsized by providing the plurality of shafts around the nut member. That is, according to the present invention, through setting of an outer diameter of the flange portion of the nut member to be small, it is possible to achieve the screw feeding device having a downsized outer diameter with the buffer function by the elastic member.

Further, the actuator, which is configured to convert the rotational motion of the electric motor into the advancing and retreating motion of the rod member in the axial direction using the screw feeding device, can be downsized whiles elastically pressing other members by the rod member, or including the buffer mechanism configured to reduce the impact load acting on the rod member from outside.

MODE FOR CARRYING OUT THE INVENTION

Now, detailed description is made of a screw feeding device and an actuator using the screw feeding device according to the present invention with reference to the attached drawings.

Figure 1:
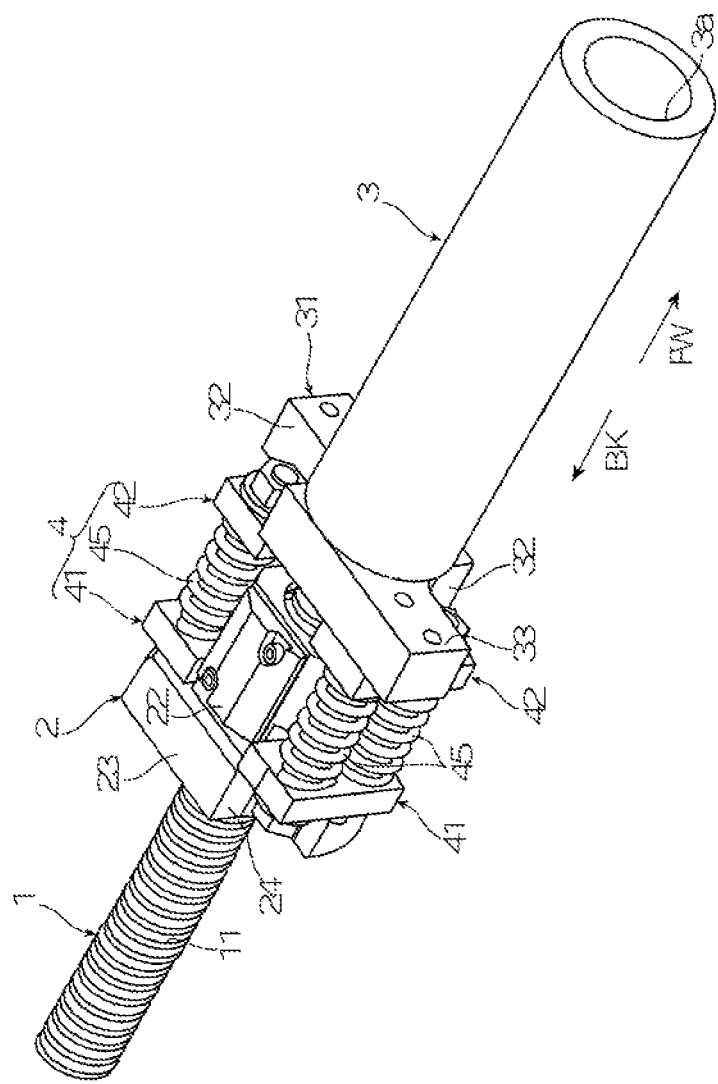
FIG. 1 is a perspective view for illustrating an example of a screw feeding device to which the present invention is applied.
Figure 2:
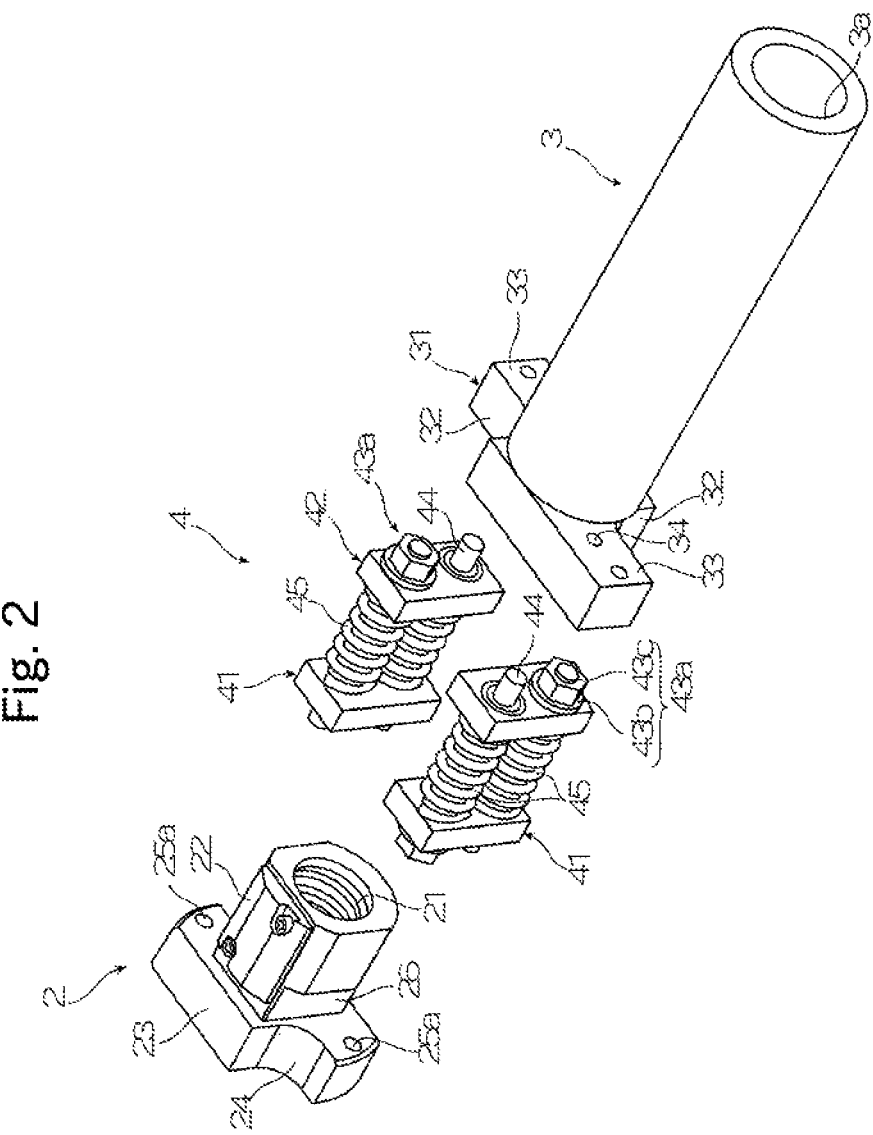
FIG. 2 is an exploded perspective view for illustrating the screw feeding device illustrated in FIG. 1.

FIG. 1 and FIG. 2 are views for illustrating an example of an embodiment of the screw feeding device to which the present invention is applied. The screw feeding device includes a screw shaft 1, a nut member 2, a rod member 3, and a buffer mechanism 4. The nut member 2 is threadedly engaged with the screw shaft 1 and is movable along with the rotation of the screw shaft 1. The rod member 3 is configured to advance and retreat in accordance with the movement of the nut member 2. The buffer mechanism 4 is configured to alleviate an impact load acting on the screw feeding device. In FIG. 2, the screw shaft 1 is omitted for easy understanding of the structures of the nut member 2, the rod member 3, and the buffer mechanism 4.

On an outer peripheral surface of the screw shaft 1, a ball rolling groove 11 having a helical shape is formed at a predetermined lead. The "lead" corresponds to a distance, toy which the ball rolling groove 11 advances in an axial direction of the screw shaft 1 while toeing formed by one circle around the screw shaft 1. Meanwhile, the nut member 2 has a through hole, into which the screw shaft 1 is inserted. The nut member 2 is formed, into a substantially cylindrical shape. On an inner peripheral surface of the through hole, there is helically formed a load ball rolling groove 21, which faces the ball rolling groove 11 of the screw shaft 1. The screw shaft 1 is mounted to the nut member 2 through intermediation of a large number of balls. The large number of balls roll between those ball rolling groove 11 and load ball rolling groove 21 while bearing the load. In FIG. 2, the balls are omitted.

Further, on an outer peripheral surface of the nut member 2, a circulating path forming member 22 is fixed. A no-load ball path is formed in the circulating path forming member 22. The no-load ball path is provided so as to straddle some turns of the load ball rolling groove 21 formed in the nut member 2. One end of the load ball rolling groove 21 of the nut member 2 is connected to another end thereof through the no-load ball path. The ball rolls on the no-load ball path under a state of being released from the load. Therefore, the ball, which has rolled on the load ball rolling groove 21 of the nut member 2, enters the no-load ball path from the one end. Then, after rolling on the no-load ball path, the ball is caused to return from the other end to the load ball rolling groove 21. That is, an endless circulation path for the ball is formed by fixing the nut member 2 to the circulating path forming member 22.

Figure 3:
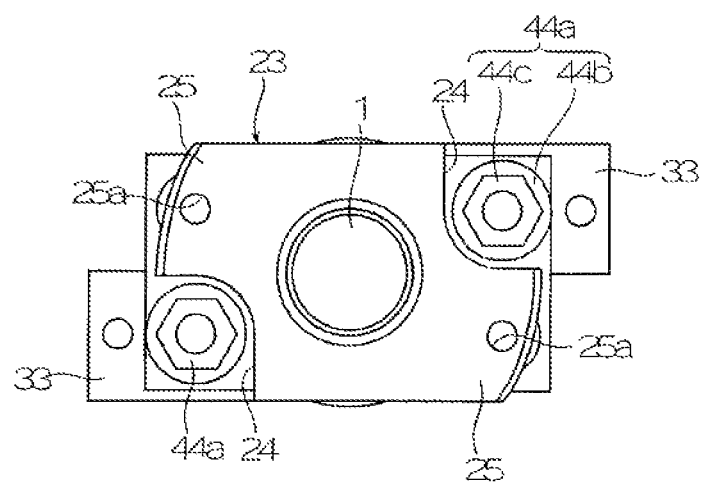
FIG. 3 is a rear view for illustrating the screw feeding device illustrated in FIG. 1 as viewed from a nut member side along an axial direction.

Further, a flange portion 23 is formed on the outer peripheral surface, of the nut member 2. The flange portion 23 is formed into a flange shape so as to project outward from the nut member 2 having a substantially cylindrical shape. As illustrated in FIG. 3, the flange portion 23 has a pair of cutout portions 24 formed across a center axis of the nut member. Through formation of the pair of cutout portions 24, the flange portion 23 has a pair of connecting portions 25 formed across the center axis of the nut member. In each of the connecting portions 25, a screw hole 25a is formed along an axial direction of the nut member 2. Further, as illustrated in FIG. 2, a pair of regulating grooves 26 is formed on the outer peripheral surface of the nut member 2. Those regulating grooves 26 regulate a moving range of first separators 41 described later. Each of the regulating grooves is formed so as to correspond to a pair of cutout portion 24 and connecting portion 25. However, in FIG. 2, only one of the regulating grooves 26 can be recognized, and another regulating groove positioned on a back side of the nut member 2 in FIG. 2 cannot be recognized.

Figure 4:
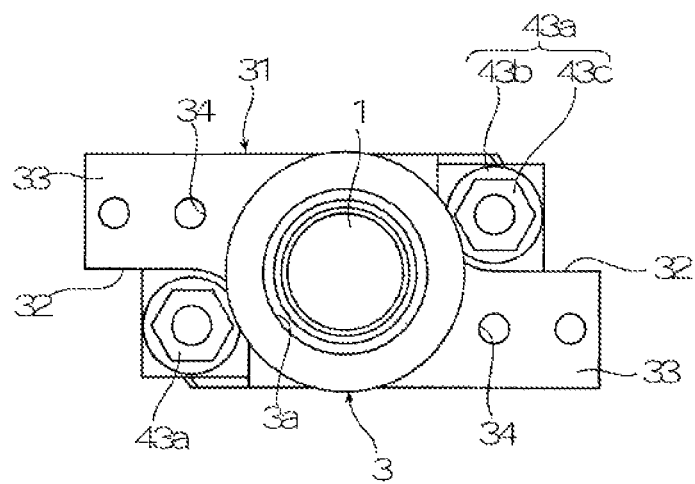
FIG. 4 is a front view for illustrating the screw feeding device illustrated in FIG. 1 as viewed from a rod member side along the axial direction.
Figure 5:
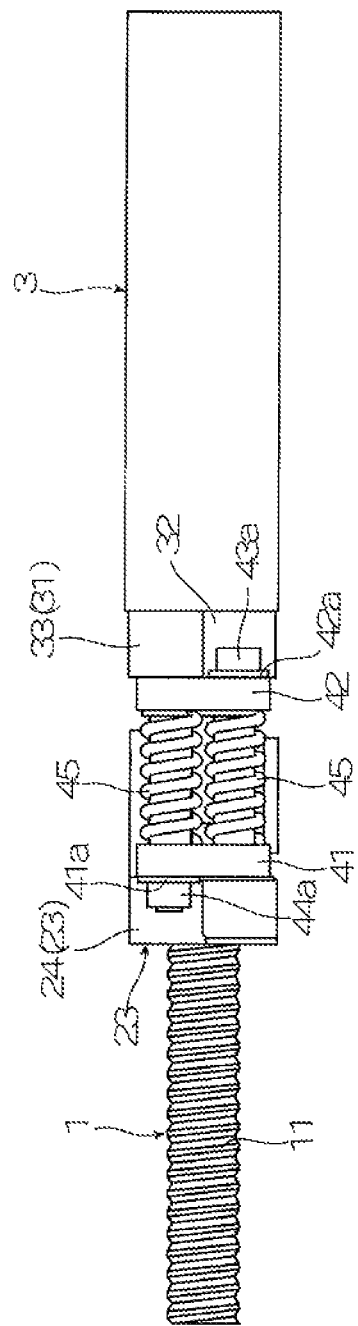
FIG. 5 is a side view for illustrating the screw feeding device illustrated in FIG. 1 under a steady state.

Next, the rod member 3 is described with reference to FIG. 4 and FIG. 5 in addition to the above-mentioned FIG. 1 to FIG. 3. The rod member 3 is formed into a cylindrical shape having a through hole 3a. Further, a mounting portion 31, which projects outward with respect to an outer diameter of the rod member, is provided, to one end of the rod member 3, which is closer to the nut member 2. The mounting portion 31 has a through, hole having an inner diameter substantially equal to that of the through hole 3a of the rod member 3. The through hole of the mounting portion 31 and the through hole 3a of the rod member 3 overlap each other. The screw shaft 1 is received in the through hole of the mounting portion 31 and the through hole 3a of the rod member 3 with a clearance. The mounting portion 31 may be formed integrally with the rod member 3, or may be machined as a separate member and then fixed to an end of the rod member 3.

Further, the mounting portion 31 has a pair of cutout portions 32 formed across a center axis of the through hole. Through formation of the pair of cutout portions 32, the mounting portion 31 has a pair of fixing arm portions 33 formed across the center axis of the through hole. A screw hole 34 is formed in each of the fixing arm portions 33 along an axial direction of the rod member 3. As is recognized from FIG. 1 to FIG. 5, in the axial direction of the screw shaft 1, the cutout portion 32 of the mounting portion 31 and the connecting portion 25 of the flange portion 23 face each other, and the fixing arm portion 33 of the mounting portion 31 and the cutout portion 24 of the flange portion 23 face each other. Accordingly, when the flange portion 23 of the nut member 2 is viewed from a distal end of the rod member through the mounting portion 31 as illustrated in FIG. 4, the connecting portion 25 of the flange portion 23 can be visually recognized from the cutout portion 32 of the mounting portion 31. Further, when the mounting portion 31 is viewed from the flange portion 23 side of the nut member 2 through the flange portion as illustrated in FIG. 3, the fixing arm portion 33 of the mounting portion 31 can be visually recognized from the cutout portion 24 of the flange portion 23.

Meanwhile, the buffer mechanism 4 includes a first shaft 43, a second shaft 44, a first separator 41, a second separator 42, and coil springs 45. The first shaft 43 has one end to be fixed to the flange portion 23 of the nut member 2 with a screw. The second shaft 44 has one end to be fixed to the mounting portion 31 of the rod member 3 with a screw. The first separator 41 and the second separator 42 are movable in an axial direction of the shafts 43 and 44 by being guided by the first shaft 43 and the second shaft 44. The coil springs 45 are elastic members provided between the first separator 41 and the second separator 42.

The first shaft 43 is formed into a substantially columnar shape, and male threads are formed at both ends thereof. The male thread at one end of the first shaft 43 is fixed to the screw hole 25a formed in the connecting portion of the flange portion 23. Meanwhile, a regulating portion 43a, which is constructed by a washer 43b and a fixing nut 43c, is threadedly engaged with the male thread at another end. The portion between the pair of male threads, which are formed, at the both ends of the first shaft 43, functions as a guide region for the first separator 41 and the second separator 42. The regulating portion 43a only needs to function as a retainer for the second separator 42 with respect to the first shaft 43. The regulating portion 43a is not limited to the washer 43b and the fixing nut 43c, which are illustrated in the drawings, as long as the regulating portion 43a is fixed to the one end of the first shaft 43.

Further, similarly to the first shaft 43, the second, shaft 44 is formed into a substantially columnar shape, and male threads are formed at both ends thereof. The male thread at one end of the second shaft 44 is fixed: to the screw hole 34 formed in the fixing arm portion 33 of the mounting portion 31. Meanwhile, a regulating portion 44a, which is constructed by a washer 44b and a fixing nut 44c, is threadedly engaged with the male thread at another end. The portion between the pair of male threads, which are formed at the both ends of the second shaft 44, functions as a guide region for the first separator 41 and the second separator 42. The regulating portion 44a only needs to function as a retainer for the first, separator 41 with respect to the second shaft 44. The regulating portion 44a is not limited to the washer 44b and the fixing nut 44c, which are illustrated in the drawings, as long as the regulating portion 44a is fixed to the one end of the second shaft 44.

Further, the first separator 41 and the second separator 42 are plate-like members formed into a substantially rectangular shape, and each have a pair of through holes, into which the first shaft 43 and the second shaft 44 are to be inserted. Inner diameters of those through holes are slightly larger than outer diameters of the first shaft 43 and the second shaft 44. Thus, the guide regions of the first shaft 43 and the second, shaft 44 can be freely moved in the axial direction of those shafts. Under a state in which the first shaft 43 and the second shaft 44 are inserted into the through holes, the first separator 41 is provided so as to be closer to the flange portion 23 than the second separator 42. Further, a part, of the first separator 41 is positioned inside the regulating groove 26 formed in the nut member 2.

Figure 6:
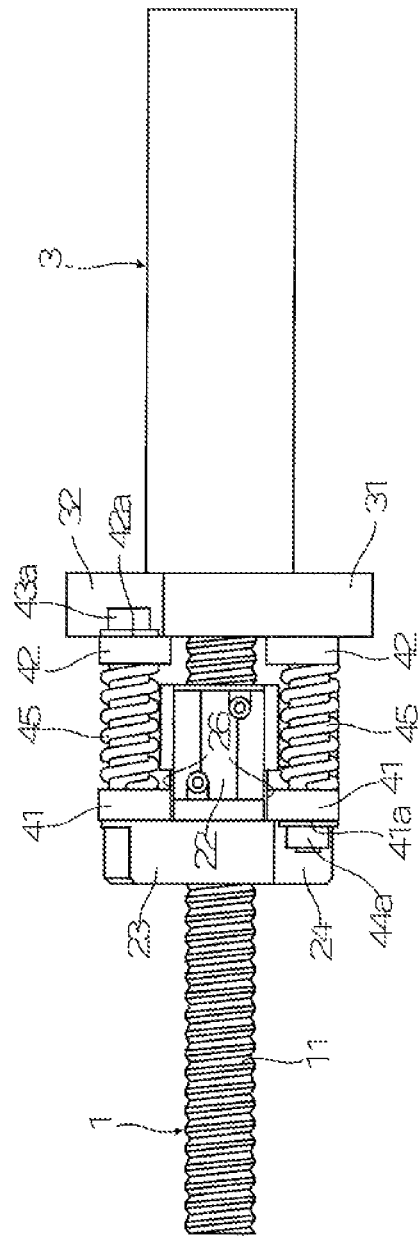
FIG. 6 is a plan view for illustrating the screw feeding device illustrated in FIG. 1 under the steady state.
Figure 7:
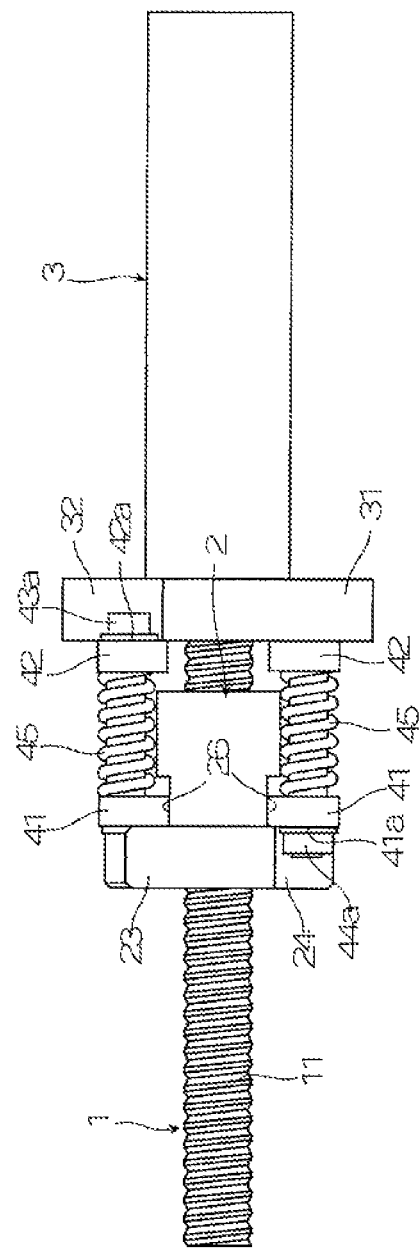
FIG. 7 is a bottom view for illustrating the screw feeding device illustrated in FIG. 1 under the steady state.

The coil springs 45 are arranged around each of the shafts 43 and 44 as a guide shaft. The coil springs 45 are arranged between the first separator 41 and the second separator 42 under a state of being compressed from a free length. Therefore, as illustrated in FIG. 5 to FIG. 7, under a state in which a load does not act between the nut member 2 and the rod member 3, the first separator 41 is urged by the coil spring 45 toward the flange portion 23 so that the first, separator 41 is held in abutment against the flange portion 23. At the same time, the regulating portion 44a of the second shaft 44 is held in abutment against an abutment surface 41a of the first separator 41, which is held in abutment against, the flange portion 23. At this time, the regulating portion 44a is received in the cutout portion 24 formed in the flange portion 23 so that the flange portion 23 and the regulating portion 44a are prevented front interfering with each other. Further, the second separator 42 is urged by the coil spring 45 toward the mounting portion 31 so that the second separator 42 is held in abutment against the mounting portion 31. At the same time, the regulating portion 43a of the first shaft 43 is held in abutment against an abutment surface 42a of the second separator 42, which is held in abutment against the mounting portion 31. At this time, the regulating portion 43a is received in the cutout portion 32 formed in the mounting portion 31 so that the mounting portion 31 and the regulating portion 43a are prevented from interfering with each other.

As described above, the first shaft 43 and the second shaft 44 are arranged so as to be reversely oriented. The regulating portion 43a of the first shaft 43 is positioned on a side opposite to the regulating portion 44a of the second shaft 44 across the coil springs 45. Accordingly, under the state in which the load does not act between the nut member 2 and the rod member 3, a distance between the first separator 41 and the second separator 42 is kept at maximum. The distance between the first, separator 41 and the second separator 42 corresponds to a distance between the regulating portion 44a of the second shaft 44 and the mounting portion 31, to which the second shaft 44 is fixed, or to a distance between the regulating portion 43a of the first shaft 43 and the flange portion 23, to which the first shaft 43 is fixed.

Further, in the screw feeding device of this embodiment, one first shaft 43 and one second shaft 44, which are reversely oriented, are regarded as one pair. Then, one first separator 41 and one second separator 42 are combined with the pair of shafts, to thereby construct a pair of buffer mechanisms 4. Two pairs, of buffer mechanisms 4 are provided to the nut member 2. The two pairs of the buffer mechanisms 4 positioned across the nut member 2 has a reverse positional relationship as for the first shaft 43 and the second shaft 44.

Next, description is made of an operation of the screw feeding device of this embodiment including the buffer mechanisms.

The screw feeding device of this embodiment including the buffer mechanisms 4 is applied to the actuator configured to convert a rotational motion of an electric motor into a linear motion by a screw feeding mechanism. In this case, for example, the electric motor (not shown) is connected to one end of the screw shaft 1, whereas the rod member 3 is guided to advance and retreat in the axial direction thereof by guide means (not shown). Further, in order to prevent rotation of the nut member 2 together with the screw shaft 1, a rotation stopper (not shown) needs to be provided to the rod member 3. Under such mode of use, when the screw shaft 1 is driven to rotate by the electric motor, the rotational motion of the screw shaft 1 is converted into the linear motion of the nut member 2. Accordingly, the rod member 3, which is coupled to the nut member 2 through intermediation of the buffer mechanisms 4, linearly advances and retreats together with the nut member 2. At this time, the screw shaft 1 advances and retreats in the through hole 3*a* of the rod member 3.

When the rod member 3 moves together with the nut member 2 through rotation of the electric motor and advances in the arrow FW direction of FIG. 1, that is, when the rod member 3 moves in a direction in which an entire length of the screw feeding device is increased, when the linear motion of the rod member 3 in the arrow FW direction is prevented for some reason, a reaction force, which is applied in a direction opposite to the arrow FW direction, acts on the rod member 3. The reaction force is transmitted to the second separator 42 through the mounting portion 31 to press the second separator 42 toward the flange portion 23 of the nut member 2.

Figure 8:
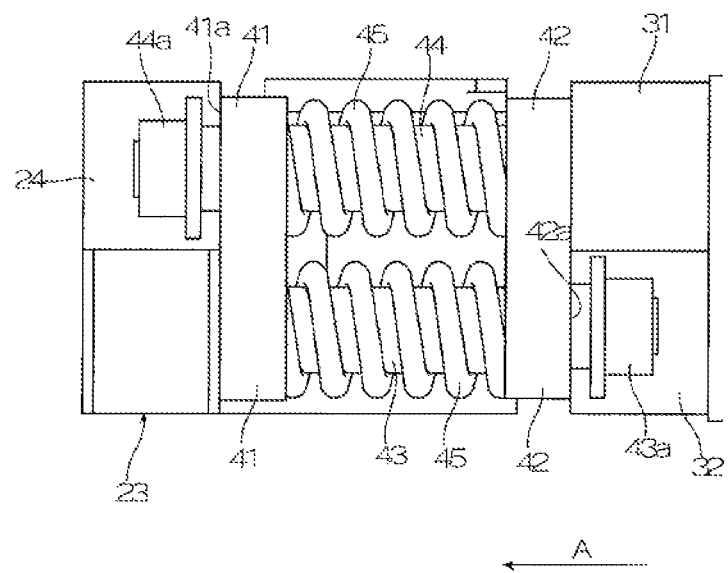
FIG. 8 is an enlarged view for illustrating a state in which a buffer mechanism of the screw feeding device illustrated in FIG. 1 bears a compressive load.

As illustrated in FIG. 8, when magnitude of the reaction force exceeds an elastic force exerted by the coil spring 45, the coil spring 45 is compressed so that the second separator 42 held in abutment against the mounting portion 31 moves in the arrow A direction. The second separator 42 is pressed against the regulating portion 43*a* of the first shaft 43 with the elastic force of the coil spring 45. Thus, when the reaction force exceeds the elastic force exerted by the coil spring 45, the second separator 42 is separated from the regulating portion 43*a* of the first shaft 43 so that the regulating portion 43*a* lifts up from the abutment surface 42*a* of the second separator 42.

At the same time, the second shaft 44, which is fixed to the mounting portion 31, also moves in the arrow A direction. At this time, the first separator 41 is pressed against the flange portion 23 with the elastic force of the coil spring 45, and cannot move in the arrow A direction. Thus, the first separator 41 is separated from the regulating portion 44*a* of the second shaft 44 so that the regulating portion 44*a* lifts up from the abutment surface 41*a* of the first separator 41.

Accordingly, the reaction force, which acts on the rod member 3 in the direction opposite to the arrow FW direction of FIG. 1, that is, the arrow A direction of FIG. 8, is not directly transmitted to the nut member 2. The reaction force is transmitted to the nut member 2 through intermediation of the coil spring 45. With this configuration, for example, even when the rod member 3 is prevented from advancing in the FW direction by an obstacle, the impact load does not act on the nut member 2. Further, through advancement of the rod member 3, other mechanical devices can elastically be pressed.

Meanwhile, when the rod member 3 moves together with the nut member 2 through rotation of the electric motor so that the rod member 3 retreats in the arrow BK direction of FIG. 1, that is, when the rod member 3 moves in a direction in which the entire length of the screw feeding device is reduced, and the linear motion of the rod member 3 in the BK direction is prevented for some reason, a reaction force, which is applied in a direction opposite to the BK direction, that is, the FW direction acts on the rod member 3. The reaction force is transmitted to the second shaft 44 fixed to the mounting portion 31, and to the first separator 41 through intermediation of the regulating portion 44*a* fixed to the second shaft.

Figure 9:
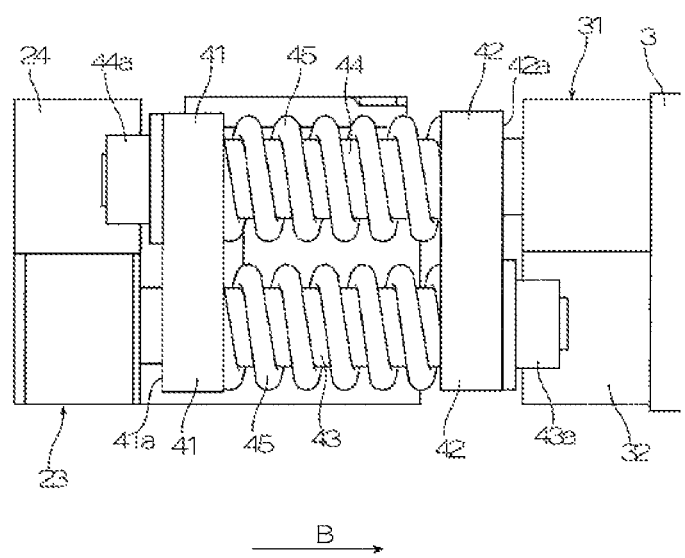
FIG. 9 is an enlarged view for illustrating a state in which the buffer mechanism of the screw feeding device illustrated in FIG. 1 bears a tensile load.

As illustrated in FIG. 9, when the magnitude of the reaction force in the FW direction exceeds the elastic force exerted by the coil spring 45, the coil spring 45 is compressed so that the second shaft 44 moves in the arrow B direction together with the rod member 3 and the mounting portion 31. Along with this, the first separator 41, which is held in abutment against, the regulating portion 44*a* of the second shaft 44, moves in the arrow B direction together with the regulating portion 44*a*. Further, the first separator 41 is pressed against the flange portion 23 of the nut member 2 with the elastic force applied by the coil spring 45. Thus, when the reaction force exceeds the elastic force exerted by the coil spring 45, the abutment surface 41*a* of the first separator 41 is separated from the flange portion 23, to thereby form a gap between the first separator 41 and the flange portion 23.

Meanwhile, the second separator 42 is pressed against the regulating portion 43*a* of the first shaft 43 with the elastic force of the coil spring 45 so that the movement of the second separator 42 in the arrow B direction is regulated. Therefore, when the mounting portion 31 moves in the arrow B direction, the abutment surface 42*a* of the second separator 42 is separated from the mounting portion 31, to thereby form a gap between the second separator 42 and the mounting portion 31.

Accordingly, the reaction force, which acts on the rod member 3 in a direction opposite to the arrow BK direction of FIG. 1, that is, in the arrow B direction of FIG. 9, is not directly transmitted to the nut member 2 but transmitted thereto through intermediation, of the coil spring 45. With this configuration, for example, the impact load does not act on the nut member 2 when the rod member 3 is prevented from retreating in the arrow BK direction for some reason. Further, through retreat of the rod member 3, other mechanical devices can elastically be drawn.

Further, when the reaction force acts on the rod member 3 in the direction opposite to the arrow BK direction of FIG. 1 and the first separator 41 moves in the arrow B direction of FIG. 9, the first separator 41 cannot move without limitation in the axial direction of the screw shaft 1. The moving range of the first separator 41 is regulated by the regulating groove 26 formed in the nut member 2. This is for the purpose of preventing the coil spring 45 from being greatly compressed between the first separator 41 and the second separator 42 when a force, which causes the first separator 41 to move in the arrow B direction, is excessively applied.

In the screw feeding device of this embodiment configured as described above, even when any one of the compressive load and the tensile load excessively acts on the rod member 3 of the screw feeding device, it is possible to prevent the load from being directly transmitted to the nut member 2 by utilizing the function of the buffer mechanism 4, thereby being capable of protecting the screw shaft 1 and the nut member 2 from the excessive load. Further, when the screw feeding device is applied to the actuator, the rod member 3 can elastically press or elastically draw other mechanical devices, thereby being capable of expanding the use of the actuator.

Further, in the screw feeding device of this embodiment, the buffer mechanism 4, which is formed of the first shaft 43, the second shaft 44, the first separator 41, the second separator 42, and the coil spring 45, is provided between the flange, portion 23 of the nut member 2 and the mounting portion 31 of the rod member 3. The flange portion 23 and the mounting portion 31 only needs to have such a size that the first shaft 43 and the second shaft 44 can be provided around of the nut member 2. Therefore, the screw feeding device including the buffer mechanism can be constructed in an extremely compact manner. When an outer diameter of the screw shaft 1 is equal to that of the screw shaft of the related-art screw feeding device which does not include the buffer mechanism, the entire size of the screw feeding device is also substantially equal to each other. Accordingly, the screw feeding device of this embodiment can easily be replaced with the related-art screw feeding device. When the screw feeding device of this embodiment is adopted, the actuator having the buffer function can easily be achieved.

In the screw feeding device of this embodiment, four shafts 43 and 44 are provided around the nut member 2 in total, but the number of the shafts 43 and 44 can be changed as appropriate in accordance with magnitude of an axial load which is to be borne by the screw feeding device. Further, the arrangement of the first shaft 43 and the second shaft 44, which are reversely oriented, may be changed in design as appropriate, still, it is preferred that each of the shafts 43 and 44 be arranged so as to be point-symmetrical to each other across the center axis of the nut member 2.

Further, the nut member 2 is mounted to the screw shaft. 1 through intermediation of the plurality of balls in the screw feeding device of this embodiment. Still, the present invention can be applied to a so-called sliding screw device, in which the nut member is mounted to the screw shaft without intermediation of the balls.

Further, the coil spring 45 is employed as the elastic member in the screw feeding device of this embodiment. Still, the elastic member is not limited thereto as long as the elastic member can urge the first separator 41 toward the flange portion 23 of the nut member 2 and can urge the second separator 42 toward the mounting portion 31 of the rod member 3.

The invention claimed is:

1. A screw feeding device, comprising:
a screw shaft;
a nut member, which has a flange portion formed on an outer peripheral surface thereof, and is mounted to the screw shaft;
a rod member, which has a mounting portion facing the flange portion of the nut member and a hollow portion; and
a buffer mechanism, which connects the flange portion of the nut member and the mounting portion of the rod member,
wherein the buffer mechanism comprises:
a first shaft fixed at one end to the flange portion of the nut member;
a second shaft fixed at one end to the mounting portion of the rod member;
a pair of separators, through which the first shaft and the second shaft respectively pass, and which is movable along the first shaft and the second shaft; and
an elastic member, which is provided between the pair of separators under a compressed state,
wherein the pair of separators comprises:
a first separator, which is held in abutment against the flange portion of the nut member by an elastic force of the elastic member; and
a second separator, which is held in abutment against the mounting portion of the rod member by the elastic force of the elastic member.

2. A screw feeding device according to claim 1, wherein the flange portion and the mounting portion have cutout portions configured to prevent interference with the plurality of shafts.

3. A screw feeding device, comprising:
a screw shaft;
a nut member, which has a flange portion formed on an outer peripheral surface thereof, and is mounted to the screw shaft;
a rod member, which has a mounting portion facing the flange portion of the nut member and a hollow portion; and
a buffer mechanism, which connects the flange portion of the nut member and the mounting portion of the rod member,
wherein the buffer mechanism comprises:
a plurality of shafts, which are provided around the nut member;
a pair of separators, through which the plurality of shafts pass, and which is movable along the plurality of shafts; and
an elastic member, which is provided between the pair of separators under a compressed state,
wherein the plurality of shafts comprise:
a first shaft, which is fixed to the flange portion of the nut member, and is relatively movable with respect to the mounting portion of the rod member; and
a second shaft, which is reversely oriented to the first shaft in an axial direction of the screw shaft, is fixed to the mounting portion of the rod member, and is relatively movable with respect to the flange portion of the nut member, and
wherein a pair of first shaft and second shaft is regarded as one pair, and at least two pairs of first shaft and second shaft are provided around the nut member.

4. A screw feeding device according to claim 3, wherein the two pairs of first shaft and second shaft are provided across the nut member.

5. A screw feeding device, comprising:
a screw shaft;
a nut member, which has a flange portion formed on an outer peripheral surface thereof, and is mounted to the screw shaft;
a rod member, which has a mounting portion facing the flange portion of the nut member and a hollow portion; and
a buffer mechanism, which connects the flange portion of the nut member and the mounting portion of the rod member,
wherein the buffer mechanism comprises:
a plurality of shafts, which are provided around the nut member;

a pair of separators, through which the plurality of shafts pass, and which is movable along the plurality of shafts; and an elastic member, which is provided between the pair of separators under a compressed state, wherein the plurality of shafts comprise:

a first shaft, which is fixed to the flange portion of the nut member, and is relatively movable with respect to the mounting portion of the rod member; and a second shaft, which is fixed to the mounting portion of the rod member and is relatively movable with respect to the flange portion of the nut member, and wherein an impact load applied from outside in an axial direction of the screw shaft is alleviated by an elastic force exerted by the elastic member sandwiched by the pair of separators through relative movement of at least one of the first shaft or the second shaft with respect to the flange portion or the mounting portion.

6. A screw feeding device, comprising:

a screw shaft;

a nut member, which has a flange portion formed on an outer peripheral surface thereof, and is mounted to the screw shaft;

a rod member, which has a mounting portion facing the flange portion of the nut member and a hollow portion; and a buffer mechanism, which connects the flange portion of the nut member and the mounting portion of the rod member, wherein the buffer mechanism comprises:

a plurality of shafts, which are provided around the nut member;

a pair of separators, through which the plurality of shafts pass, and which is movable along the plurality of shafts; and an elastic member, which is provided between the pair of separators under a compressed state, wherein the nut member has a regulating groove, which is formed along the plurality of shafts, and is configured to regulate a moving range of the pair of separators formed on an outer peripheral surface thereof.

7. An actuator, which is configured to convert a rotational motion of an electric motor into an advancing and retreating motion of a rod member in an axial direction through use of the screw feeding device of claim 1.

* * * * *